United States Patent [19]

Lin

[11] Patent Number: 5,634,383
[45] Date of Patent: Jun. 3, 1997

[54] BICYCLE SHOE PLATE HOLDING-DOWN DEVICE

[76] Inventor: Wen-Hwa Lin, No. 816, Chan Shen Rd., Tiah Shen Tsun, Wei Pu Hsiang, Taichung Hsien, Taiwan

[21] Appl. No.: 625,417

[22] Filed: Mar. 29, 1996

[51] Int. Cl.6 ....................................................... G05G 1/14
[52] U.S. Cl. ........................................................ 74/594.6
[58] Field of Search .............................. 74/594.6, 594.4; 36/131

[56] References Cited

U.S. PATENT DOCUMENTS

| | | | |
|---|---|---|---|
| 4,686,867 | 8/1987 | Bernard et al. | 74/594.6 |
| 4,928,549 | 5/1990 | Nagano | 74/594.6 |
| 5,003,841 | 4/1991 | Nagano | 74/594.4 |
| 5,195,397 | 3/1993 | Nagano | 74/594.4 |
| 5,259,270 | 11/1993 | Lin | 74/594.6 |
| 5,442,976 | 8/1995 | Cheng | 74/594.6 |
| 5,497,680 | 3/1996 | Nagano | 74/594.6 |
| 5,522,282 | 6/1996 | Nagano | 74/594.6 |

FOREIGN PATENT DOCUMENTS

| | | | |
|---|---|---|---|
| 516013 | 12/1992 | European Pat. Off. | 74/594.6 |
| 3832067 | 3/1990 | Germany | 74/594.6 |

*Primary Examiner*—Charles A. Marmor
*Assistant Examiner*—MaryAnn Battista
*Attorney, Agent, or Firm*—Varndell Legal Group

[57] ABSTRACT

A bicycle shoe plate holding-down device which includes a holding-down plate mounted inside the pedal body of a bicycle pedal and moved along sliding rails therein to hold down the shoe plate of a bicycle shoe and having a screw hole, a transmission member turned to moved the holding-down plate into engagement with the shoe plate of the bicycle shoe, having a screw rod at one end threaded into the screw hole of the holding-down device, a rotary knob coupled to one end of the transmission member for turning it by hand, and a tensile spring mounted around the transmission member and stopped between the holding-down plate and a collar on the transmission member.

1 Claim, 3 Drawing Sheets

BICYCLE SHOE PLATE HOLDING-DOWN DEVICE

BACKGROUND AND SUMMARY OF THE INVENTION

The present invention relates to a bicycle shoe plate holding-down device installed in the pedal body of a bicycle pedal and controlled to hold down the shoe plate of a bicycle shoe attached thereto.

The pedals of racing bicycles are different from that of regular bicycles. As shown in FIGS. 1 and 2, the pedal body of a racing bicycle has two opposing flanges raised from the top for the engagement of two opposing flanges of a shoe plate, which is fixedly secured to the sole of a bicycle shoe. The pedal body is installed with a holding-down device controlled to hold down the shoe plate in the shoe body. This holding-down device comprises a shaft installed in the shoe body, holding-down plate mounted around the shaft, a circular push plate fixedly mounted around the shaft and having a stepped front side abutted against the holding-down plate, and a knob fixed to one end of the shaft for turning by hand. When the shaft is turned by hand through the knob, the holding-down plate is forced forwards step by step by the stepped front side of the circular push plate into engagement with the shoe plate. This structure of holding-down device is functional, however it is not practical for fine adjustment. Therefore, the foot may feel uncomfortable when the bicycle shoe is fixed to the pedal.

The present invention has been accomplished to provide a bicycle shoe plate holding-down device which eliminates the aforesaid drawback. According to the present invention, the bicycle shoe plate holding-down device comprises a holding-down plate mounted inside the pedal body of a bicycle pedal and moved along sliding rails therein to hold down the shoe plate of a bicycle shoe and having a screw hole, a transmission member turned to move the holding-down plate into engagement with the shoe plate of the bicycle shoe, having a screw rod at one end threaded into the screw hole of the holding-down device, a rotary knob coupled to one end of the transmission member for turning it by hand, and a tensile spring mounted around the transmission member and stopped between the holding-down plate and collar on the transmission member. Because the holding-down plate is moved along the screw rod of the transmission member, fine adjustment can be achieved as desired.

DETAILED DESCRIPTION OF THE PREFERRED EMBODIMENT

Referring to Figures from 3 to 6, a shoe plate holding-down device in accordance with the present invention is generally comprised of a holding-down plate 51, a tensile spring 52, a transmission member 53, and a rotary knob 54.

Figure 1:
FIG. 1 is an exploded view of a bicycle pedal, a shoe plate, and a bicycle shoe according to the prior art.
Figure 2:
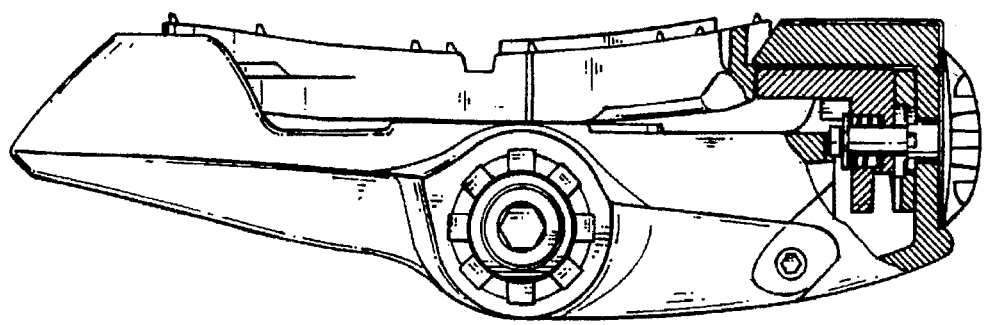
FIG. 2 is a sectional view showing the shoe plate secured to the bicycle pedal according to the prior art.
Figure 3:
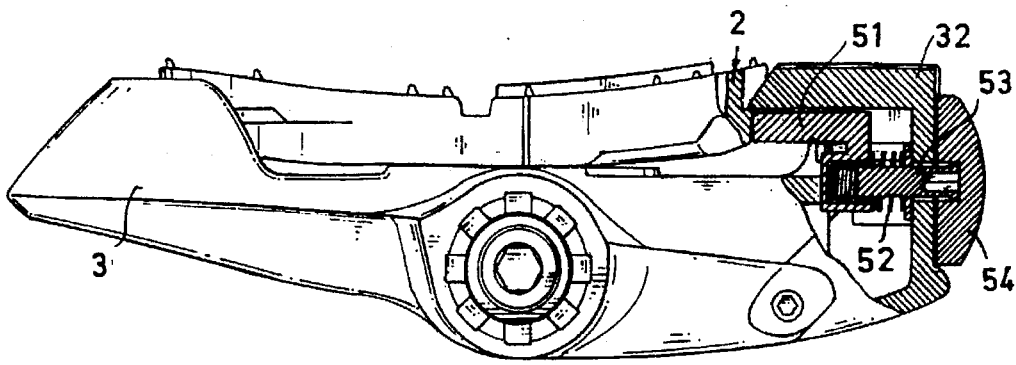
FIG. 3 is a sectional view of the present invention, showing the shoe plate secured in place by the holding-down plate.
Figure 5:
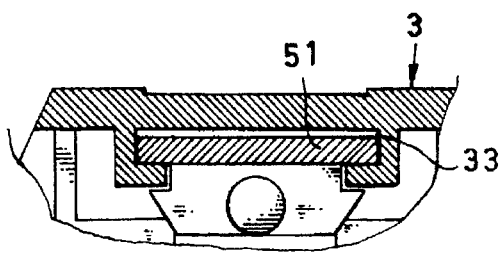
FIG. 5 is a cross-sectional view taken along line 5—5 of FIG. 4.
Figure 4:
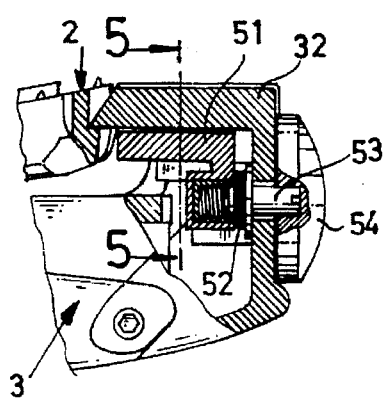
FIG. 4 is a another sectional view of the present invention, showing the holding-down plate released from the shoe plate.
Figure 6:
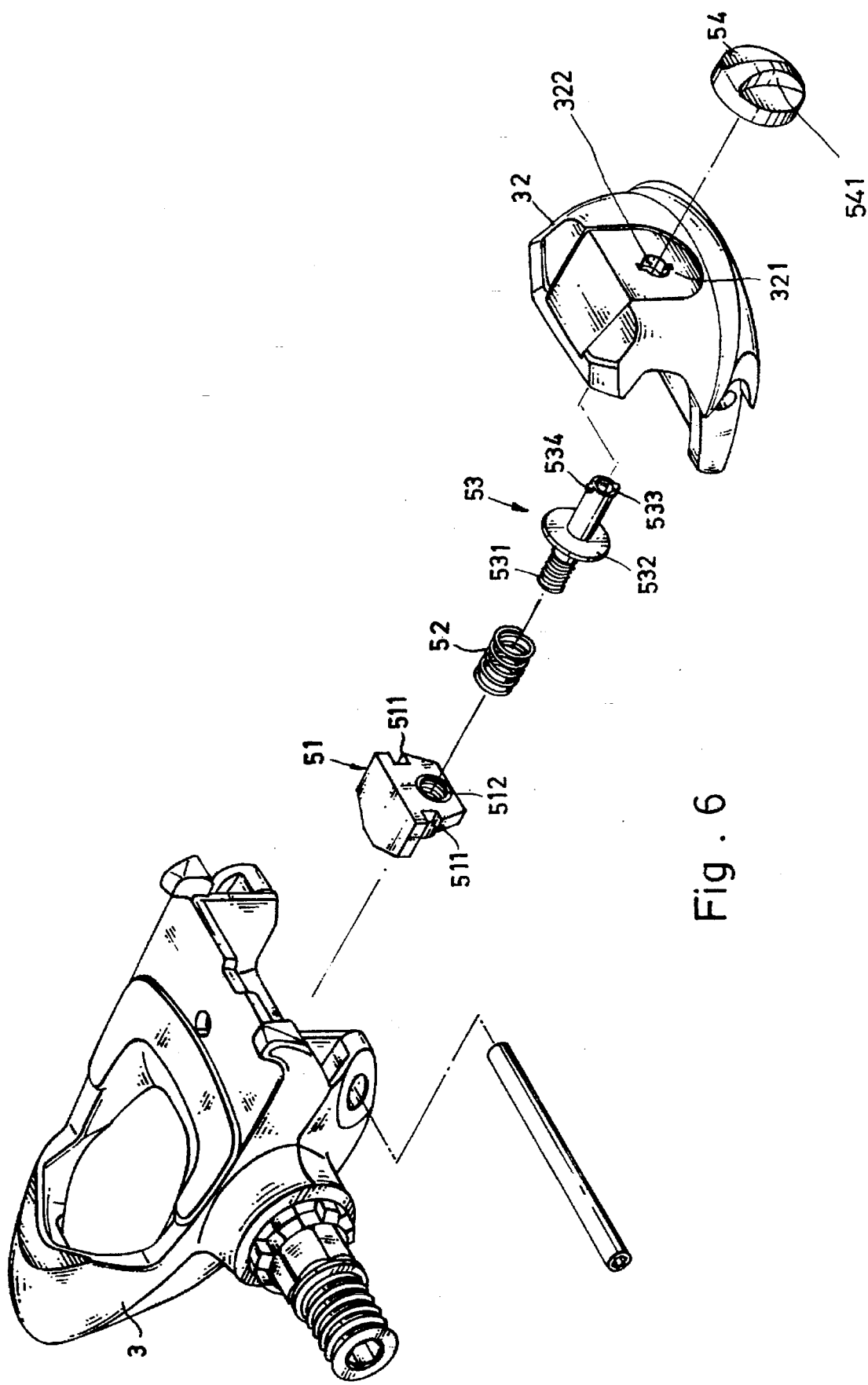
FIG. 6 is an exploded view of the present invention.

The holding-down plate 51 is mounted inside the pedal body 3, having two sliding grooves 511 at two opposite sides respectively and slidably engaged with respective inside rails 33 inside the peal body 3 (see FIG. 5), and a screw hole 512 coupled to the transmission member 53. The transmission member 53 has a front end terminating in a screw rod 531 which is threaded into the screw hole 512 of the holding-down plate 51, a collar 532 in the middle, and a rear end terminating in an axial hexagonal hole 533 and a radial key 534. The tensile spring 52 is mounted around the screw rod 531 of the transmissiom member 53 and stopped between the holding-down plate 51 and the collar 532 of the transmission member 53. When the holding-down plate 51, the tensile spring 52, and the transmission member 53 are coupled together and mounted in the pedal body 3, a cover 32 is fastened to the pedal body 3 and covered on the transmission member 53. The cover 32 has a recessed portion 32t at an outer side, and a through hole 322 at the center of the recessed portion 321 for the passing of the rear end of the transmission member 53. The rotary knob 54 has a T-groove at an inner side (not shown) forced into engagement with the radial key 534 of the rear end of the transmission member 53 (see FIG. 3), and a handle 541 at an outer side for turning by hand. When the rotary knob 54 is forced into engagement with the radial key 534 of the rear end of the transmission member 53, it is closely and revolvably attached to the recessed portion 321 of the cover 32. When the shoe plate 2 of the bicycle shoe is attached to the pedal body 3, the transmission member 53 is turned by the rotary knob 54 to force the holding-down plate 51 forwards, causing it to hold down the shoe plate 2 of the bicycle shoe. By means of turning the rotary knob 54 forwards and backwards, the pressure of the holding-down plate 51 to the shoe plate 2 is adjusted. Furthermore, if the rotary knob 54 is not attached to the transmission member 53, the transmission member 53 can be turned by a socket wrench through the axial hexagonal hole 533.

I claim:

1. A bicycle shoe plate device holding-down device comprising:

a holding-down plate mounted inside a pedal body of a bicycle pedal and moved to hold down a shoe plate of a bicycle shoe, said holding-down plate having two sliding grooves at two opposite sides respectively and slidably engaged with respective sliding rails inside the pedal body, and a screw hole spaced between said sliding grooves;

a transmission member coupled to said holding-down plate and turned to move said holding-down plate fownwards and backwards along the sliding rails of the pedal body, said transmission member comprising a screw rod at one end threaded into the screw hole of said holding-down plate, an axial hexagonal hole and radial key at an opposite end extended out of a through hole on a cover of the pedal body, and a collar raised around the middle of the transmission member and disposed inside the cover of said pedal body;

a rotary knob coupled to said transmission member and driven to turn it, said rotary knob having a T-groove at an inner side forced into engagement with the radial key of said transmission member, and a handle at an outer side for turning by hand; and a tensile spring mounted around the screw rod of said transmission member and stopped between said holding-down plate and the collar of said transmission member.

\* \* \* \* \*